United States Patent [19]

Kolvereid

[11] Patent Number: 5,413,388
[45] Date of Patent: May 9, 1995

[54] COMPRESSION-TYPE PIPE JOINT USING THREADED CLAMP HAVING LONGITUDINALLY SLOTTED INNER SLEEVE

[76] Inventor: Harald Kolvereid, Lilleåsveien 21, N-8610 Grubhei, Norway

[21] Appl. No.: 177,184

[22] Filed: Jan. 3, 1994

Related U.S. Application Data

[63] Continuation of Ser. No. 917,038, Jul. 31, 1992, abandoned.

[30] Foreign Application Priority Data

Jan. 31, 1990 [NO] Norway .................... 900454

[51] Int. Cl.⁶ .................................... F16L 21/06
[52] U.S. Cl. ............................ 285/323; 285/243; 29/890.144
[58] Field of Search .............. 285/322, 323, 243; 411/237; 29/890.144

[56] References Cited

U.S. PATENT DOCUMENTS

| | | | |
|---|---|---|---|
| 371,753 | 10/1887 | Gerald | 285/243 |
| 733,995 | 7/1903 | Profitlich et al. | 285/373 |
| 1,298,303 | 3/1919 | Dempsey . | |
| 1,659,268 | 2/1928 | Hooley . | |
| 1,683,415 | 9/1928 | Selah . | |
| 2,452,278 | 10/1948 | Woodling | 285/122 |
| 2,517,706 | 8/1950 | Paquin | 29/890.144 |
| 2,544,712 | 3/1951 | Miller | 285/323 |
| 2,761,702 | 9/1956 | Noel | 285/323 |
| 4,005,884 | 2/1977 | Drori | 285/323 |
| 4,685,706 | 8/1987 | Kowal et al. | 285/322 |
| 4,909,689 | 3/1990 | Komatsu | 411/237 |
| 4,936,727 | 6/1990 | Kolvereid | 411/237 |
| 5,232,249 | 8/1993 | Kolvereid | 285/323 |

FOREIGN PATENT DOCUMENTS

| | | |
|---|---|---|
| 79416 | 10/1932 | Denmark . |
| 0086509 | 8/1983 | European Pat. Off. . |
| 530811 | 12/1921 | France . |
| 814155 | 6/1937 | France . |
| 1018851 | 1/1953 | France . |
| 1050716 | 7/1955 | France . |
| 1600466 | 10/1976 | Germany . |
| 81664 | 12/1953 | Norway . |
| 87205 | 6/1936 | Sweden . |
| 273369 | 6/1927 | United Kingdom . |
| 1352445 | 5/1974 | United Kingdom . |

*Primary Examiner*—Eric K. Nicholson
*Attorney, Agent, or Firm*—Cushman Darby & Cushman

[57] ABSTRACT

Mechanical constriction of pliable pipes, for example, annealed copper pipes or pipes of plastic, a corrugated fitting sleeve or connecting piece on, for example, a T-pipe, bend or equipment such as, for example, valves, takes place with the aid of a clamp coupling including an outer sleeve which is rotatable relative to an inner sleeve which is provided with a longitudinal slot. Mechanical joining of hard pipes, for example, of copper or steel, or attaching of such pipes to a connecting piece on a T-pipe, bend or equipment such as, for example, valves, is provided for with the aid of such a clamp coupling where the interior of the inner sleeve is provided with at least a pair of annular beads and a cylindrically shaped sealing gasket.

12 Claims, 2 Drawing Sheets

COMPRESSION-TYPE PIPE JOINT USING THREADED CLAMP HAVING LONGITUDINALLY SLOTTED INNER SLEEVE

This is a continuation of application Ser. No. 07/917,038, filed on Jul. 31, 1992, which was abandoned upon the filing hereof.

BACKGROUND OF THE INVENTION

The present invention relates to methods and devices for joining pipes and for attaching pipes to connecting pieces on T-pipes, bends and equipment such as valves, faucets, measuring instruments, etc.

It is previously known to slide pipes or tubes onto the outside of connecting pieces and to clamp them securely to the connecting piece by means of a clamping device. It is also known to employ a fitting sleeve that covers both pipes or tubing ends, or the pipe/tubing end and a connecting piece. Further, it is known to use gaskets in connection with such seals.

According to the prior art, pipes are usually joined by means of welding, soldering, compression joints, clamping sleeve couplings or flanges. The various methods have their strong and weak aspects and have therefore won favor in different areas. In the art of sanitary equipment, for pipes of pliable material such as plastic, it is particularly the methods employing clamping rings and clamping sleeves that have gained ground, as well as welding for weldable plastic.

For pipes of annealed copper, the common practice involves soldering to bends, T-pipes and sockets, this being presently the only permissible method for installations that are to be concealed in walls or flooring.

A common coupling method for open installations which is both rapid and simple involves compression joints in combination with support linings. The disadvantage of this method is that the pipes are easily damaged as a result of the assembly method, which results in leakage after a period of use. For this reason it is not permitted to use this method where the pipes are to be built into walls or floors.

Welding methods have been developed for plastic piping, but In practice this is a time-consuming process compared to use of compression joints and, moreover, may only be used on weldable plastic, while other types of plastics are steadily gaining an increasing share of the market.

A number of different types of compression joints are also available for plastic, some of them for use in combination with support linings, while others are intended to be used without them. One of such types without support linings is damaging to the surface of the pipe under the clamping ring, and therefore cannot be used on pipes having a diffusion block at the surface. Couplings for pipes carrying hot water require support linings.

It is a common feature of all types of compression joints that the compression of the clamping ring should take place through axial movement of the adjacent parts, and for this reason the effective width of the clamping ring must be limited. The combination of axial movement for the ring's adjacent parts, achieved by virtue of standard threads and the narrow clamping ring, affords poor control with the surface pressure between the ring and the pipe, which easily results in damage to the pipe.

The numerous parts in a compression joint give it a considerable weight and make it expensive to produce.

SUMMARY OF THE INVENTION

The present methods and devices are aimed at alleviating the problems that have just been described.

One achieves through the Invention a controlled clamping of the pliable pipe against the connecting piece or support lining, or, alternatively, for hard pipes (without a support lining), of the sleeve lining against the pipe. The clamping is controlled by visually observing when the slot In the inner sleeve closes, and also by determining through a marked increase In the adjustment moment or force that the slot has been closed, which is a sign that the desired compression has been achieved. Tightening in excess of what is necessary to obtain desired compression force, however, will not damage the pipe, since the force is absorbed by the inner sleeve which is dimensioned for this purpose and which together with the support lining and the pipe, now causes the outer sleeve to expand.

For pliable pipe, it is convenient to use an internal support in the form of a straight sleeve, a bend, a T-pipe or a connecting piece on a valve, etc., which is inserted into the pipe up to a marked stop. On the outside of the pipe is placed a clamping sleeve having an outer whole sleeve that is and an inner sleeve having a through-going slot.

For hard copper piping, steel pipes and the like where a support lining is not needed, the inner sleeve is permitted to cover both pipe ends, or the pipe end and connecting piece of, e.g. a valve block, while sealing is achieved through the use of a gasket.

In order for the present invention to function in practice, it is of considerable importance that the slot in the inner sleeve be correctly dimensioned relative to the pipe's tolerance and the desired compression force. Further, the material thickness in the inner sleeve and outer sleeve must be balanced in relation to each other to minimize undesirable deformation of the pipe on exaggerated tightening thereof.

The combination of a support lining in the case of a joint, connecting piece at a bend, T-pipe, valves, etc., and a clamping sleeve having dimensions in accordance with the above, provides a solution for joining pipes or coupling piping to equipment which can be carried out without unintentional damage to the pipes. On hard pipes the same effect is achieved by use of a clamp coupling in combination with a gasket.

BRIEF DESCRIPTION OF THE DRAWINGS

The invention will now be described in more detail with reference to the enclosed figures.

DETAILED DESCRIPTION

Figure 1:
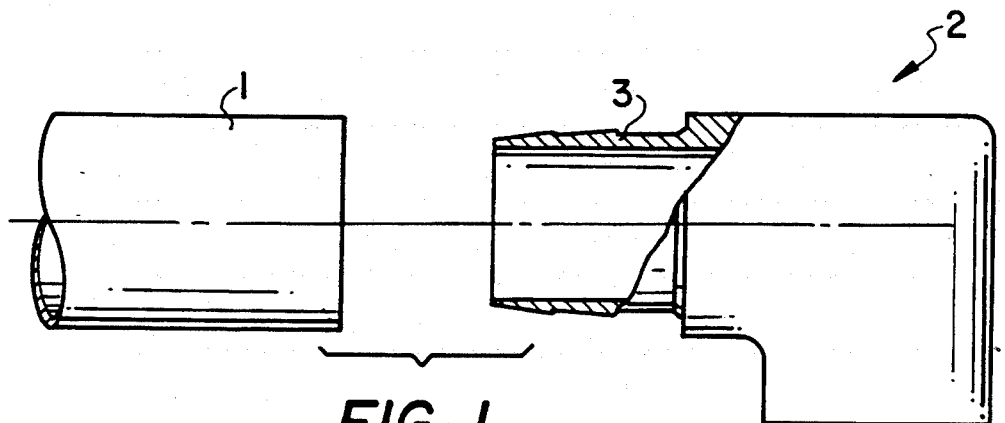
FIG. 1 shows a pipe, and a bend with connecting pieces.
Figure 2:
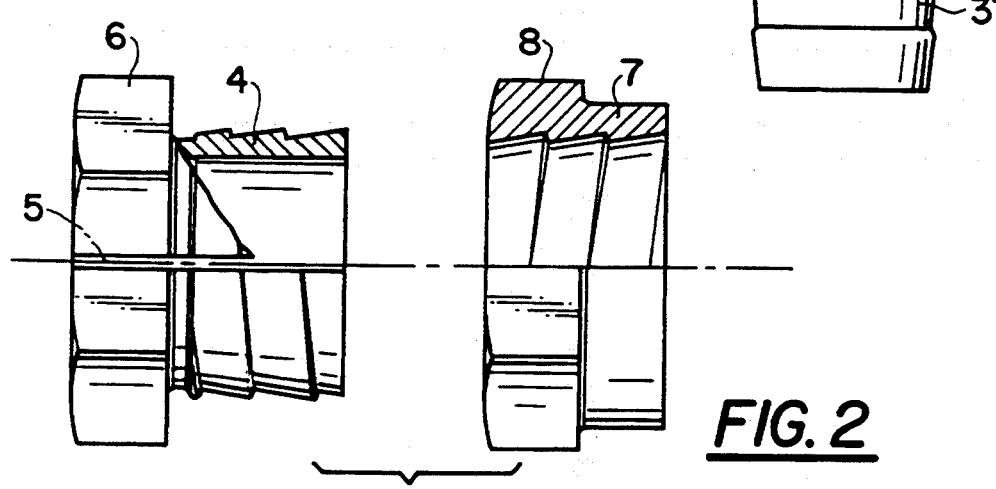
FIG. 2 shows an inner sleeve of a clamp coupling, and an outer sleeve of the clamp coupling.

In FIG. 1 the pipe is designated with reference numeral 1. The bend 2 in FIG. 1 has connecting pieces 3, 3'. The inner sleeve of the clamp coupling is designated in FIG. 2 with reference numeral 4, and the inner sleeve is provided with a slot 5 as well as a wrench grip 6. The outer sleeve designated by reference numeral 7 and has a wrench grip 8. As is apparent from the drawings, the external helical threads on the inner sleeve 4 and the internal helical threads on the outer sleeve 7 are cylindrical, rather than being conical. That is, a line drawn longitudinally along their crests would be parallel to rather than aimed to intersect the longitudinal axis of the respective sleeve.

Figure 3:
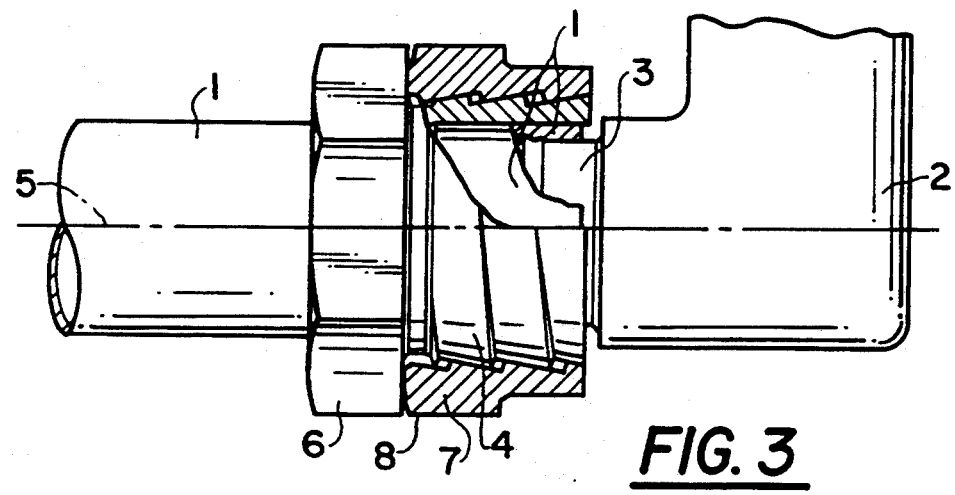
FIG. 3 shows a pipe coupled to a bend by means of the clamp coupling in FIG. 2.

As is shown in FIG. 3, the pipe 1 is brought over the connecting piece S of bend 2, and on the outside of this assembly the inner sleeve 4 with the slot 5 and the wrench grip and stop edge 6 is assembled together with the outer sleeve 7 having the mentioned wrench grip 8. The outer sleeve 7 is screwed toward the combined wrench grip and stop edge 6 and is tightened. When this happens, the slot 5 will be completely clamped together, as clearly indicated in FIG. 3.

Figure 4:
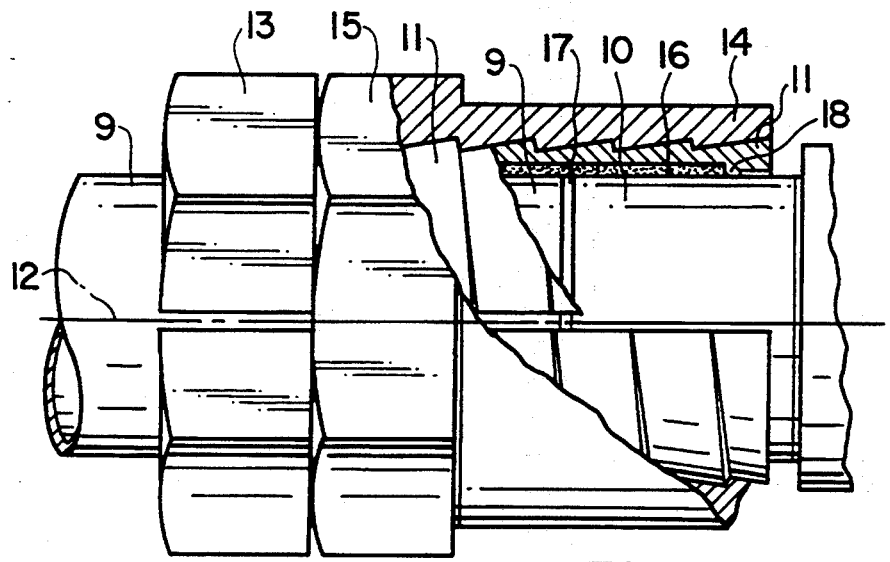
FIG. 4 illustrates a pipe that has been coupled to a connecting piece on a bend.

In FIG. 4 there is shown a pipe 9. The reference numeral 10 designates, for example, a pipe or a connecting piece on a bend, a T-pipe or the like. To hold the pipe 9 and the pipe or connecting piece 10 in coupled position there is used a clamp coupling consisting of an inner sleeve 11 having a slot 12 and a wrench grip 13 together with an outer sleeve 14 with wrench grip 15. In FIG. 4 all the parts are shown assembled and ready for tightening. Between said pipe 9 and the pipe or connecting piece 10 there is provided a gasket 16 in a cut-out 17 on the inner sleeve 11. At each interior end of the inner sleeve a bead 18 is thus formed. Although not shown on FIG. 4, there is also a corresponding bead 18 at the other end of the inner sleeve, preferably in connection with the threaded section thereof.

Figure 5:
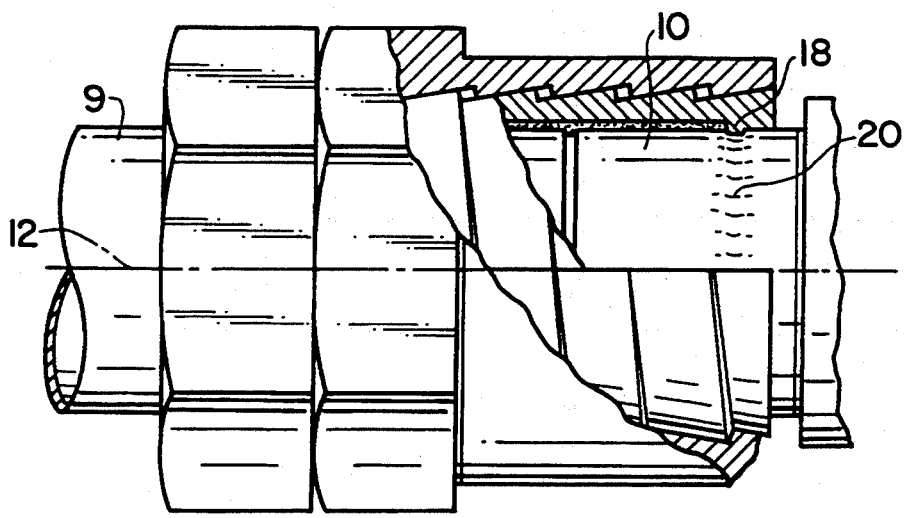
FIG. 5 illustrates the coupling of FIG. 4 in tightened state.

In FIG. 5 the clamp coupling is shown in tightened state, whereby the slot 12 is closed and the bead 18 is pressed against and somewhat into the pipe or connecting piece 10 such that a slight indentation 20 is formed around the pipe or connecting piece 10. In a similar manner by means of the other bead (not shown), a constriction against the pipe 9 will take place. This will ensure that there is no axial movement between the parts 9 and 10 when the clamp coupling is tightened.

The joining of pliable pipes or coupling of such pipes to a connecting piece is accomplished by sliding the sleeve parts of the clamp coupling in assembled state onto the pipe 1, hereafter the connecting piece 3 is pushed into the pipe 1. Then the clamp coupling 4-8 is slid into position such that the threaded section covers the connecting piece S on an extension piece, bend, T-pipe, a valve, etc. In this position the sleeve portion 7 (outer sleeve) is rotated while it abuts contact with the combined wrench grip and stopper means The rotation is done by turning the wrench grips 5 and 8 in opposite directions until the slot 5 is clamped into its closed state. The pipe 1, which is pliable, will thereby be cold-shrunk securely to the connecting piece S, the surface of which has an approximately saw-toothed form.

When the slot 5 is closed, the mechanical constriction of the pipe end 1 over the corrugated, preferably sawtooth formed connecting piece 3 is completed, and a tight and mechanically durable connection is achieved between the T-pipe, the bend, the valve, etc., designated in general with the reference numeral 2, against the pipe 1.

When the slot 5 in the sleeve part 4 is closed, a continued tightening will now cause this sleeve part 4 to be compressed together with the pipe end 1 and the connecting piece 3, which requires a considerable increase in tightening moment and therefore clearly indicates that the tightening phase has been completed.

On continued tightening in this phase, the sleeve part 7 will expand, provided the wall thickness of the sleeve is correctly dimensioned, and unintentional deformation of the pipe end 1 is therefore avoided.

Pliable pipes are often delivered in coiled form, which may result in a cross-sectional profile that deviates from the circular. In order for the support sleeve or connecting piece on a T-pipe, bend or equipment to fill the pipe 1 to maximum degree, it is recommendable to make such support sleeves or sleeves conical at their end in order to expand the smallest diameter of the pipe by means of the conical configuration. The rounded tips on the conical sections will on tightening cause the deformation of the pipe to occur without indications of rupture, which is an important precondition for avoiding breakage when the pipe is subjected to mechanical stresses.

It is important that the threaded sections of the clamp coupling lie over the connecting piece section 3. This means, in the embodiment form shown in FIG. 3, that the wrench grip parts 6, 8 on, respectively, the inner lining and the outer sleeve face away from the bend 2. During tightening of the compression joint the slot 5 will, as has been mentioned, be closed, and the tightening moment will finally increase considerably, which both visually and purely mechanically indicates that the operation is completed. In the tightening phase the wrench grip part 6 on the inner sleeve 4 will not be subjected to the same compression force as the rest of the sleeve, since the wrench grip part 6 lies outside the outer sleeve 7. This together with the fact that the wrench grip part 6 is more heavy duty than the rest of the sleeve and meets the same internal resistance from the pipe, means that this part of the slot does not close completely on tightening. It is definite that the slot 5 will be closed completely under the outer sleeve 7, while at the outer edge, furthest from the outer sleeve 7, it will have a slight but distinct opening. The result is that the pipe 2 will receive maximum intended deformation under the outer sleeve 7, a deformation which decreases gradually and approaches zero under the wrench grip part 6.

A pipe in engagement as outlined above will endure a considerably greater exterior mechanical stress before it is overloaded than is the case with use of conventional compression joints where there is no distribution of the stresses at the edges.

Although the above describes the coupling of pipes, it will immediately be understood that this may also apply to tubes, for example, those made of plastic.

The joining of pipes or coupling of a pipe to a connecting piece on a T-pipe, bend, valve housing or the like as depicted in FIGS. 4 and 5 shows mechanical contraction and limitation of the pipe's deformation, similar to that shown in the preceding figures.

For hard copper piping, steel pipes and the like there is no need for a support lining inside the pipes. One may attach the clamp coupling directly to the outside of the pipe 9 if the slot 12 in the inner sleeve is closed, and this task is solved by insertion of the cylindrical gasket 15 situated in a recess 17 on the inside of the inner sleeve 11.

At the starting point, as shown in FIG. 4, the gasket 16 has a thickness corresponding to the depth of the groove 17. When the slot 12 in the inner sleeve 11 is closed, the bead 18 and the other bead, not shown, at the other end of the threaded section on the inner sleeve 11 will thereby be pressed into respective pipe wall parts 9, 10, and the gasket will simultaneously be put under pressure, thereby providing for sealing between the pipe end 9 and the pipe or the connecting piece 10. As is apparent from FIG. 5, the bead 18 will cause indentations to be made in the pipe or the connecting piece 20, and corresponding indentations will also be made in the pipe 9 by the bead that is not shown. The parts are thereby mechanically locked to each other.

It has been shown through repeated trials that when one uses an inner sleeve without a slot, plastic deformation of the inner sleeve occurs when it is tightened with the force required for effective axial locking. The deformation will make it difficult later on for the sleeve to be moved axially on the pipe when the outer sleeve is loosened.

If the inner sleeve has a through-going slot, as in the present embodiment, and a width adapted to the pipe's tolerances and the constriction thereof on tightening, it will resume its original form when the outer sleeve is loosened. This is due to the slot and the natural resilience that will be present in the material of the inner sleeve; and when the outer sleeve is thus loosened, the sleeve parts in the clamp coupling could be slid in onto the free pipe end or ends, and a faucet, a bend, T-piece, for example, between two pipe ends or the like could thus be removed without the pipe end or ends being forced to move axially or radially. In a permanent installation where the parts are to be replaced, this is of considerable importance in simplifying maintenance and repair. This, too, has been shown through experiments.

I claim:

1. A method for joining a pliable pipe at an end thereof, to a tubular element that is externally provided adjacent an end thereof with circumferential corrugations comprising:
   (a) providing a clamp coupling including:
      an externally cylindrically threaded generally tubular inner sleeve longitudinally split by a total of one axially and radially complete longitudinal slot extending therealong and therethrough, and an externally accessible wrench gripping the slot having a width equating to a predetermined fraction of the outer diameter of the pliable pipe; and
      an internally cylindrically threaded tubular outer sleeve having an externally accessible wrench grip;
   (b) assembling the pliable pipe to the tubular element so that the end of the pliable pipe is telescopically coaxially received upon the tubular element with said corrugations engaging an internal circumferential wall surface of said pliable pipe;
   (c) loosely threadedly assembling said inner and outer sleeves of said clamp coupling to one another and disposing said loosely assembled clamp coupling so as to radially surround said telescopically assembled pliable pipe and tubular element;
   (d) wrenching in angularly opposite directions on said wrench grips and thereby tightening said clamp coupling until a marked rise in tightening torque is experienced, indicating sufficient tightening, said outer sleeve resultingly radially compressing said inner sleeve sufficiently to substantially close said slot, as longitudinal edges of said inner sleeve bounding said slot engage one another, and causing said inner sleeve thereby to radially inwardly squeeze said pliable pipe against said corrugations on said tubular element, said inner sleeve slot being selected to be a predetermined width such that the amount of radial squeezing provided in step (d) is within a predetermined acceptable range of sufficiency, for providing a sound joint between the pliable pipe and the tubular element, without destroying said pliable pipe or tubular element.

2. A compression-type joint, comprising:
   a pliable pipe having a longitudinal bore opening through an end;
   a tubular element having a longitudinal bore opening through an end; said tubular element, adjacent said end thereof having external circumferential corrugations thereon:
   a clamp coupling including:
      an externally cylindrically threaded tubular inner sleeve longitudinally split by a total of one axially and radially complete longitudinal slot extending therealong and therethrough, said slot having respective angularly opposite edges; said inner sleeve further inducing an externally accessible wrench grip, the slot having a width equating to a predetermined fraction of the outer diameter of the pliable pipe; and
      an internally cylindrically threaded tubular outer sleeve having an externally accessible wrench grip;
   said pliable pipe being assembled to said tubular element so that the end of the pliable pipe is telescopically coaxially received upon the tubular element with said corrugations engaging an internal circumferential wall surface of said pliable pipe within said longitudinal bore of said pliable pipe;
   said clamp coupling being sized to permit said inner and outer sleeves thereof to be loosely threadedly assembled to one another with said opposite edges of said slot remaining gapped apart in the circumferential direction of said inner sleeve, with said clamp coupling radially surrounding said telescopically assembled pliable pipe and tubular element;
   said clamp coupling further being so sized that, upon wrenching in angularly opposite directions on said wrench grips for tightening said clamp coupling, said outer sleeve radially compresses said inner sleeve sufficiently to substantially close said slot, as said opposite edges engage one another, thereby causing said inner sleeve to radially inwardly squeeze said pliable pipe against said corrugations on said tubular element, by an amount of squeezing which is limited to be within a predetermined acceptable range of sufficiency for providing a sound joint between the pliable pipe and tubular element without destroying the pliable pipe or tubular element.

3. A method for joining a hard pipe at an end thereof, to a tubular element at an end thereof, comprising:
   (a) providing a clamp coupling including:
      an externally cylindrically threaded generally tubular inner sleeve longitudinally split by a total of one axially and radially complete longitudinal slot extending therealong and therethrough, and an externally accessible wrench grip; and
      an internally cylindrically threaded tubular outer sleeve having an externally accessible wrench grip, the slot having a width equating to a predetermined fraction of the outer diameter of the hard pipe;

said inner sleeve further including a longitudinal bore having two axially spaced longitudinally split circumferential annular beads protruding radially inwardly therein; and a cylindrical gasket coaxially disposed in said bore axially between said beads;

said inner sleeve bore and cylindrical gasket being substantially coextensive circumferentially of said clamp coupling;

(b) loosely assembling the hard pipe, tubular element and clamp coupling to one another such that:

said hard pipe and said tubular member are axially aligned end-to-end;

said inner and outer sleeves are loosely threadedly assembled to one another to provide a loosely assembled clamp coupling; and said loosely assembled clamp coupling is disposed so that said ends are both located within said longitudinal bore and axially between said split circumferential annular beads, one said bead surrounds said hard pipe and the other said bead surrounds said tubular element, and said gasket surrounds both said hard pipe and said tubular element;

(c) wrenching in angularly opposite directions on said wrench grips and thereby tightening said clamp coupling until a marked rise in tightening torque is experienced, indicating sufficient tightening, said outer sleeve resultingly radially compressing said inner sleeve sufficiently to substantially close said slot, as longitudinal edges of said inner sleeve bounding said slot engage one another, and causing said inner sleeve thereby to radially inwardly squeeze said beads and said gasket against said hard pipe and said tubular element, said inner sleeve slot being selected to be of a predetermined width such that the amount of squeezing provided in step (c) is within a predetermined acceptable range of sufficiency for providing a sound joint between the hard pipe and the tubular element, without destroying said hard pipe or tubular element, said wrenching being sufficient as to cause radial compression of said gasket and partial penetration of said beads respectively into said hard pipe and said tubular element.

4. A compression-type joint, comprising:

a hard pipe having a longitudinal bore opening through an end;

a tubular element having a longitudinal bore opening through an end;

said hard pipe and tubular element being disposed end-to-end in axial alignment;

a clamp coupling including:

an externally cylindrically threaded tubular inner sleeve longitudinally split by a total of one axially and radially complete slot extending therealong and therethrough, the slot having a width equating to a predetermined fraction of the outer diameter of the hard pipe, said slot having respective angularly opposite edges; said inner sleeve further including an externally accessible wrenching grip; and an internally cylindrically threaded tubular outer sleeve having an externally accessible wrench grip;

said inner sleeve further inducing a longitudinal bore having two axially spaced longitudinally split circumferential annular beads protruding radially inwardly therein; and a cylindrical gasket coaxially disposed in said bore axially between said beads;

said inner sleeve bore and cylindrical gasket being substantially coextensive circumferentially of said clamp coupling;

said clamp coupling being sized to permit said inner and outer sleeves thereof to be loosely threadedly assembled to one another with said opposite edges of said slot remaining gapped apart in the circumferential direction of said inner sleeve, with said clamp coupling radially surrounding said axially aligned hard pipe and tubular element so that said ends are both located within said longitudinal bore and axially between said split circumferential annular beads, one said bead surrounding said hard pipe and the other said bead surrounding said tubular element, and said gasket surrounding both said hard pipe and said tubular element;

said clamp coupling further being so sized that, upon wrenching in angularly opposite directions on said wrench grips for tightening said clamp coupling, said outer sleeve resultingly radially compresses said inner sleeve sufficiently to substantially close said slot, as longitudinal edges of said inner sleeve bounding said slot engage one another, and cause said inner sleeve thereby to radially inwardly squeeze said beads and said gasket against said hard pipe and said tubular element, said inner sleeve slot being selected to be of a predetermined width such that the amount of squeezing occurring as a result of said wrenching is within a predetermined acceptable range of sufficiency for providing a sound joint between the hard pipe and the tubular element, without destroying said hard pipe or tubular element, as said gasket becomes compressed and said beads partially penetrate respectively into said hard pipe and said tubular element due to said tightening.

5. The method of claim 1, wherein:
said pliable pipe is made of plastic material.

6. The method of claim 1, wherein:
said pliable pipe is made of annealed copper.

7. The compression-type joint of claim 2, wherein:
said pliable pipe is made of plastic material.

8. The compression-type joint of claim 2, wherein:
said pliable pipe is made of annealed copper.

9. The method of claim 3, wherein:
said hard pipe is made of copper.

10. The method of claim 3, wherein:
said hard pipe is made of steel.

11. The compression-type joint of claim 4, wherein:
said hard pipe is made of copper.

12. The compression-type joint of claim 4, wherein:
said hard pipe is made of steel.

* * * * *

UNITED STATES PATENT AND TRADEMARK OFFICE
CERTIFICATE OF CORRECTION

PATENT NO. : 5,413,388
DATED : May 9, 1995
INVENTOR(S) : Kolvereid

It is certified that error appears in the above-indentified patent and that said Letters Patent is hereby corrected as shown below:

On the title page: Item [63] should read -- Continuation of Ser. No. 917,038, July 31, 1992, abandoned. Filed as PCT/N091/00011, January 30, 1991

Signed and Sealed this

Fourth Day of June, 1996

Attest:

BRUCE LEHMAN

*Attesting Officer*     *Commissioner of Patents and Trademarks*